United States Patent [19]
Endou

[11] Patent Number: 5,805,324
[45] Date of Patent: Sep. 8, 1998

[54] OPTICAL SCANNER

[75] Inventor: Osamu Endou, Kawasaki, Japan

[73] Assignee: Ricoh Company, Inc., Tokyo, Japan

[21] Appl. No.: 560,572

[22] Filed: Nov. 20, 1995

[30] Foreign Application Priority Data

Dec. 6, 1994 [JP] Japan .................................. 6-302248

[51] Int. Cl.$^6$ .................................................. G02B 26/08
[52] U.S. Cl. ......................... 359/208; 359/206; 359/207; 347/259
[58] Field of Search .................................... 359/196, 205, 359/208, 212, 216–219, 207; 347/256, 258–260

[56] References Cited

U.S. PATENT DOCUMENTS

| 5,233,454 | 8/1993 | Sakuma et al. | 359/196 |
| 5,408,095 | 4/1995 | Atsuumi et al. | 250/236 |
| 5,426,298 | 6/1995 | Sakuma et al. | 250/235 |
| 5,504,613 | 4/1996 | Itabashi et al. | 359/210 |
| 5,510,826 | 4/1996 | Koide | 347/256 |
| 5,572,353 | 11/1996 | Iizuka et al. | 359/207 |

Primary Examiner—Paul M. Dzierzynski
Assistant Examiner—Darren E. Schuberg
Attorney, Agent, or Firm—Oblon, Spivak, McClelland, Maier & Neustadt, P.C.

[57] ABSTRACT

In an optical scanner, a deflected light beam is reflected on a reflective image forming element and is converged as a light spot on a scanned face through an elongated lens to perform an optical scanning operation at an equal speed. The reflective image forming element has a reflecting face with rotation symmetry and converges a reflected light beam onto the scanned face in a main scan-corresponding direction. The elongated lens has a barrel type toroidal face as an incident face and has a normal toroidal face as a light emitting face. The elongated lens sets the scanned face and the forming position of a linear image to a substantially conjugate relation in a cross scan-corresponding direction in cooperation with the reflective image forming element. A conjugate magnification $m_0$ in the conjugate relation of the reflective image forming element and the elongated lens with respect to an image height 0 of the light spot satisfies the following condition:

$$1 > m_0 > 0.35.$$

5 Claims, 2 Drawing Sheets

OPTICAL SCANNER

BACKGROUND OF THE INVENTION

1. Field of the Invention

The present invention relates to an optical scanner using a reflective image forming element.

2. Description of the Related Art

An optical scanner is a device for recording an image by scanning a light beam converged onto a scanned face as a light spot. The optical scanner is widely known in association with a digital copying machine, an optical printer, etc.

Recently, a high quality of the recorded image has been strongly required with respect to the optical scanner. In particular, high resolution of the recorded image is required. Accordingly, a recording density of 400 dpi or more has been usual with respect to the optical scanner.

A diameter of the light spot converged onto the scanned face must be small to increase the recording density. It is necessary that no diameter of the light spot is greatly scattered with respect to a designed value of the spot diameter to realize the recorded image having a stable high quality. Further, it is necessary that no spot diameter is greatly varied in accordance with the height of an image of the light spot.

The spot diameter can be corrected by electrically adjusting an application time of a signal for recording one pixel even when the spot diameter is varied and scattered with respect to a main scanning direction. However, it is difficult to make such a correction with respect to a cross scanning direction. Therefore, in particular, scatter and variation of the spot diameter must be effectively restrained in the cross scanning direction.

SUMMARY OF THE INVENTION

It is therefore a first object of the present invention to provide a novel optical scanner in which an optical system for converging a light beam as a light spot on a scanned face has a reflective image forming element having an image forming action and it is possible to effectively reduce scatter of a spot diameter with respect to its designed value in a cross scanning direction.

A second object of the present invention is to provide a novel optical scanner for effectively reducing scatter of a spot diameter with respect to its designed value in a cross scanning direction and effectively reducing a variation in spot diameter in the cross scanning direction caused in accordance with the height of an image of the light spot.

A third object of the present invention is to provide an optical scanner for effectively reducing scatter of a spot diameter with respect to its designed value in a cross scanning direction and/or a variation in spot diameter in the cross scanning direction caused in accordance with the height of an image of the light spot, and having preferable light utilization efficiency.

In accordance with a first construction of the present invention, the above first object can be achieved by an optical scanner in which light of a peripheral portion of a light beam from a light source is interrupted by an aperture and is then focused and formed as a linear image extending in a main scan-corresponding direction;

this light is deflected at an angular velocity by an optical deflector having a deflecting reflecting face in the vicinity of the linear image; and the deflected light beam is reflected on a reflective image forming element and is converged as a light spot on a scanned face through an elongated lens to perform an optical scanning operation at an equal speed;

the optical scanner being constructed such that the reflective image forming element has a reflecting face with rotation symmetry and has a function for converging the reflected light beam onto the scanned face in the main scan-corresponding direction;

the elongated lens has a barrel type toroidal face as an incident face and has a normal toroidal face as a light emitting face;

the elongated lens has a function for setting the scanned face and a forming position of the linear image to a substantially conjugate relation in a cross scan-corresponding direction in cooperation with the reflective image forming element; and a conjugate magnification in the conjugate relation of the reflective image forming element and the elongated lens is set to $m_0$ with respect to an image height 0 of the light spot and this $m_0$ satisfies the following condition $$1 > m_0 > 0.35. \qquad (1)$$

In accordance with a second construction of the present invention, the conjugate magnification in the conjugate relation of the reflective image forming element and the elongated lens is set to $m_0$ with respect to the image height 0 of the light spot and is set to $m(H)$ with respect to an image height H, and these $m_0$ and $m(H)$ satisfy the following condition.

$$m(H)/m_0 < 1.1 \qquad (2)$$

In accordance with a third construction of the present invention, with respect to the deflected light beam forming the light spot at the image height 0 on the scanned face, $\theta$ is set to an angle formed between an incident direction of this deflected light beam incident to the reflective image forming element and a reflecting direction of this deflected light beam reflected on the reflective image forming element, and this $\theta$ satisfies the following condition.

$$\theta < 8 \text{ degrees} \qquad (3)$$

The above second object can be achieved by the second construction.

The above third object can be achieved by the third construction.

Further objects and advantages of the present invention will be apparent from the following description of the preferred embodiments of the present invention as illustrated in the accompanying drawings.

DESCRIPTION OF THE PREFERRED EMBODIMENTS

Figure 1:
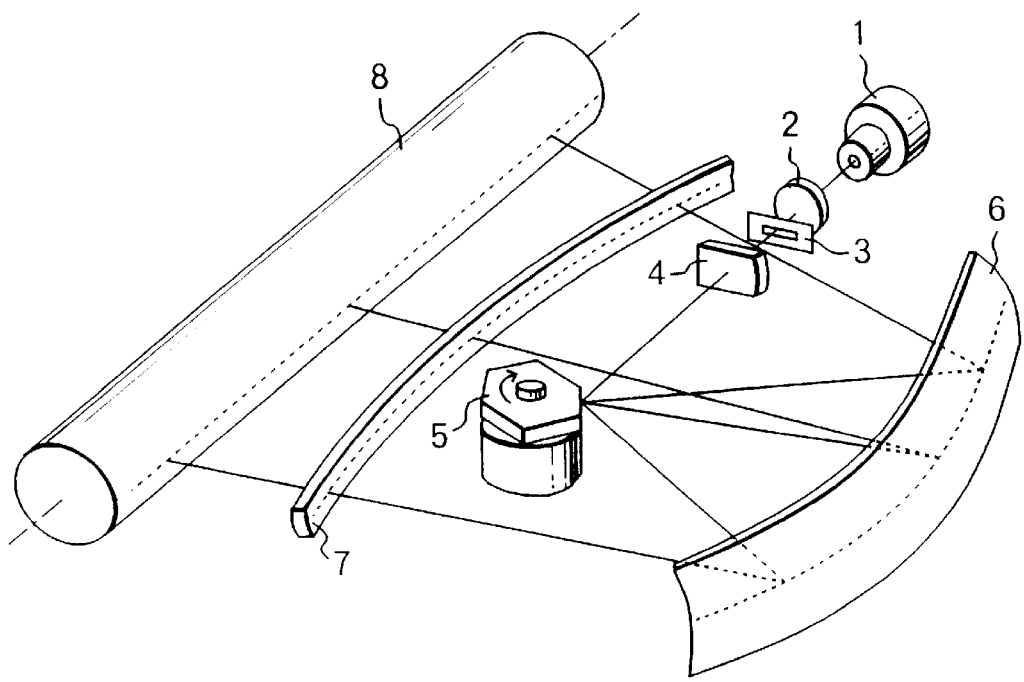
FIG. 1 is a perspective view showing only a main portion of an optical scanner as one example to which the present invention can be applied.

The preferred embodiments of an optical scanner in the present invention will next be described in detail with reference to the accompanying drawings.

In an optical scanner of the present invention, light of a peripheral portion of a light beam from a light source is interrupted by an aperture and is then focused and formed as a linear image extending in a main scan-corresponding direction. This light is deflected at an angular velocity by an optical deflector having a deflecting reflecting face in the vicinity of the linear image. The deflected light beam is reflected on a reflective image forming element and is converged as a light spot on a scanned face through an elongated lens to perform an optical scanning operation at an equal speed.

The light source is generally constructed by a laser light source and is preferably constructed by a semiconductor laser.

The aperture is used to adjust a shape of the light spot formed on the scanned face.

The optical deflector can be constructed by using a rotary polygon mirror, a rotary two-face mirror, a rotary one-face mirror, etc.

In a state of the image height 0 of the light spot, an optical path from the light source to the scanned face is linearly developed so that a virtual optical path is supposed. A main scan-corresponding direction is set to a direction parallel to a main scanning direction and corresponding to this main scanning direction on this virtual optical path. A cross scan-corresponding direction is set to a direction parallel to a cross scanning direction and corresponding to this cross scanning direction on this virtual optical path.

The reflective image forming element has a reflecting face with rotation symmetry and has a function for converging the reflected light beam onto the scanned face in the main scan-corresponding direction.

The elongated lens has a barrel type toroidal face as an incident face and has a normal toroidal face as a light emitting face. The elongated lens has a function for setting the scanned face and a forming position of the linear image to a substantially conjugate relation in the cross scan-corresponding direction in cooperation with the reflective image forming element.

A conjugate magnification (lateral magnification) in the conjugate relation of the reflective image forming element and the elongated lens is set to $m_0$ with respect to an image height 0 of the light spot and this $m_0$ satisfies the following condition in a first construction of the present invention.

$$1 > m_0 > 0.35. \quad (1)$$

In a second construction of the present invention, in addition to the first construction, the conjugate magnification in the conjugate relation of the reflective image forming element and the elongated lens is set to $m_0$ with respect to the image height 0 of the light spot and is set to $m(H)$ with respect to an image height H, and these $m_0$ and $m(H)$ satisfy the following condition.

$$m(H)/m_0 < 1.1 \quad (2)$$

In a third construction of the present invention, in addition to the first or second construction, with respect to the deflected light beam forming the light spot at the image height 0 on the scanned face, θ is set to an angle formed between an incident direction of this deflected light beam incident to the reflective image forming element and a reflecting direction of this deflected light beam reflected on the reflective image forming element, and this θ satisfies the following condition.

$$\theta < 8 \text{ degrees} \quad (3)$$

In a fourth construction of the present invention, the reflecting face of the reflective image forming element is not limited to a normal spherical face, but can be formed in the shape of a coaxial aspherical surface in the first, second or third construction.

In a fifth construction of the present invention, the barrel type toroidal face of the elongated lens on its incident side is not limited to a normal barrel type toroidal face, but can be set to a non-spherical barrel type toroidal face in the first, second, third or fourth construction.

In a sixth construction of the present invention, the light beam incident to the aperture from the light source may be set to a parallel light beam, a convergent light beam or a divergent light beam.

FIG. 1 schematically shows only a main portion of an optical scanner as a typical example to which the present invention can be applied.

A laser beam is emitted from a laser light source 1 constructed by a semiconductor laser. Divergence of this laser beam is restrained by a coupling lens 2 constituting a light source together with the laser light source 1. This light beam is changed to a parallel light beam, a converged light beam or a light beam having divergence weaker than that of the first emitted light beam. This light beam is then incident to an aperture 3 and a peripheral portion of the light beam is interrupted by this aperture 3. The light beam is converged by a cylindrical lens 4 only in a cross scan-corresponding direction. This light beam is then formed as a linear image extending in a main scan-corresponding direction in the vicinity of a deflecting reflecting face of a rotary polygon mirror 5 as an optical deflector.

The light beam reflected on the deflecting reflecting face is changed to a light beam deflected at an equal angular velocity by an equal speed rotation of the rotary polygon mirror 5. This deflected light beam is incident to a reflective image forming element 6. When the light beam is reflected on this reflective image forming element 6, the light beam is converged as a light spot on a photosensitive body 8 having a drum shape through an elongated lens 7. Thus, the photosensitive body 8 is optically scanned at an equal speed. A scanned face is a virtual plane coming in contact with the photosensitive body 8.

The reflective image forming element 6 has a reflecting face with rotation symmetry around an optical axis of an optical system. The reflective image forming element 6 has a function for converging the reflected light beam onto the scanned face in the main scan-corresponding direction. An elongated lens 7 has a barrel type toroidal face as an incident face and has a normal toroidal face as a light emitting face. The elongated lens 7 has a function for setting a forming position of the above linear image and the scanned face in a substantially conjugate relation in the cross scan-corresponding direction in cooperation with the reflective image forming element 6.

A conjugate magnification in the above conjugate relation is slightly different in accordance with the height of an image of the light spot as a formed image.

A diameter of the light spot is a diameter of the light beam in an image forming position of the deflected light beam in design. The diameter of the light spot is shifted from its designed value when this image forming position is shifted from the scanned face in an optical axis direction of the light beam.

This shift in the image forming position is caused by errors in processing and assembly of an optical element. When the optical element is formed by a plastic material, the shift in the image forming position is also caused by changes in shape and refractive index of a plastic optical system caused by influences of temperature and humidity. Such a shift in the image forming position causes scatter of the spot diameter.

When a conjugate magnification $m_0$ at an image height 0 satisfies $m_0<1$, it is possible to effectively restrain scatter of the spot diameter in a cross scanning direction caused by the errors in processing and assembly of the optical element and the influences of temperature and humidity.

When $m_0>1$ is satisfied, a longitudinal magnification $m_0^2$ is increased so that the image forming position is greatly shifted in the optical axis direction of the light beam in accordance with causes of the above scatter. Therefore, this scatter itself is also increased.

The above conjugate magnification $m_0$ is changed in accordance with a position of the elongated lens 7 in the optical axis direction and is reduced as the elongated lens 7 approaches the scanned face.

Figure 2A:
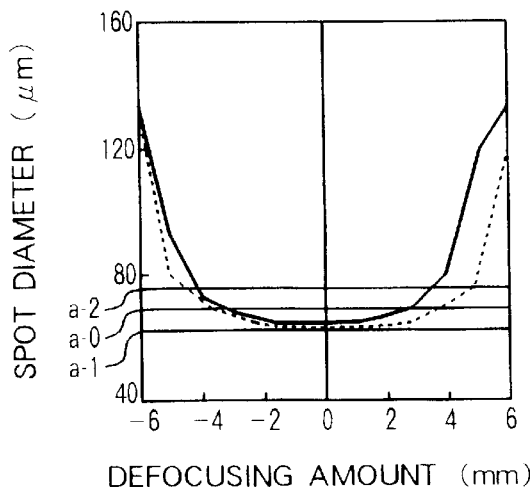
FIGS. 2a and 2b are views respectively showing the relation between a defocusing amount and spot diameters in main and cross scanning directions with respect to an embodiment 1.
Figure 2B:
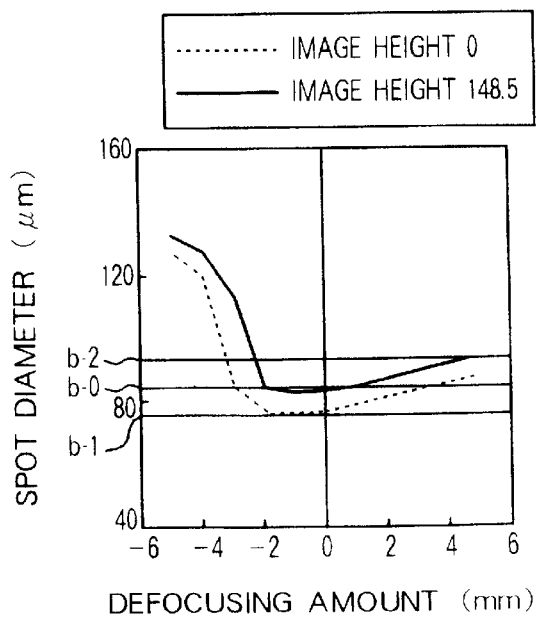

When $m_0<1$ is satisfied and a position of the laser light source 1 is set to a normal position provided in consideration of compactness of an optical housing, the spot diameter in the cross scanning direction becomes asymmetric by influences of diffraction caused by the aperture 3 before and after an image face as shown by a broken line in FIG. 2b as one example. When a coordinate on an axis of abscissa showing a defocusing amount is equal to zero and the defocusing amount is equal to zero, the deflected light beam is formed as an image on the scanned face as the image face.

A degree of this asymmetry becomes notable as the value of $m_0$ becomes small when the position of the laser light source 1 is constant.

When a recording density is equal to or greater than 400 dpi, an allowable range of the scatter of the spot diameter in the cross scanning direction is within ±10% of the spot diameter in design.

In FIG. 2b, three straight lines b-0, b-1 and b-2 are parallel to the axis of abscissa. The straight line b-0 shows a designed value 85 μm of the spot diameter in the cross scanning direction. A region between the straight lines b-1 and b-2 is within ±10% of the designed value of the spot diameter in the allowable range of scatter of the spot diameter.

In FIG. 2b, a range of the defocusing amount within the above allowable region of the spot diameter can be considered as a depth range of the scanned light beam. If a range of the above shift in the image forming position is within this depth range, the spot diameter in the cross scanning direction is within the allowable range even when the image forming position is shifted. Accordingly, a suitable optical scanning operation can be performed in this case.

In an optical scanner in which an effective length of optical scan is equal to or longer than 200 mm, it is necessary to consider that the above shift in the image forming position is about 4 mm at its maximum.

When the above condition (1) is satisfied, it is possible to set a depth range coping with a shift of about 4 mm in the image forming position at its maximum.

The spot diameter in each of the main scanning direction and the cross scanning direction is also varied by the height of an image of the light spot. The variation of the spot diameter caused by the image height is caused by influences of aberrations and a variation of the conjugate magnification caused by the image height.

The above conjugate magnification m(H) at the image height H is defined as m(H)=y'/y as a ratio of y' to y. In this case, y is a size of the linear image in the cross scan-corresponding direction formed at a deflecting point of the deflected light beam. y' is a size of a geometrical optical image in the cross scanning direction formed at the image height H.

The condition (2) of $m(H)/m_0<1.1$ prescribes that no variation of the conjugate magnification caused by the image height exceeds 10%. When this condition (2) is satisfied, it is possible to restrain the variation of the spot diameter caused by the image height in the cross scanning direction irrespective of the variation of the conjugate magnification according to the image height.

In the optical scanner shown in FIG. 1, a direction of the light beam incident to the reflective image forming element 6 and a direction of the light beam reflected on this reflective image forming element 6 are separated from each other in the cross scan-corresponding direction by inclining or shifting the reflective image forming element 6 in the cross scan-corresponding direction.

When these directions are not separated from each other, the reflected light beam from the reflective image forming element 6 is eclipsed by the optical deflector so that no reflected light beam reaches the scanned face. To avoid such a situation, it is sufficient to arrange a light beam separating means such as a half mirror between the optical deflector 5 and the reflective image forming element 6. However, when such a light beam separating means is arranged, an amount of light reaching the scanned face is greatly reduced so that light utilization efficiency is reduced.

As shown in FIG. 1, if the above directions of the incident and reflected lights are separated from each other in the cross scan-corresponding direction by inclining or shifting the reflective image forming element 6, the light utilization efficiency is high and an arrangement of optical elements is easily laid out.

However, when an inclining angle or a shifting amount of the reflective image forming element 6 is excessively increased, comatic aberration of the optical system outside its optical axis is increased. Accordingly, the spot diameter in the cross scanning direction is increased at a high image height so that the spot diameter in the cross scanning direction is greatly varied by the image height.

The condition (3) is a condition capable of effectively restraining the variation of the spot diameter caused by such comatic aberration outside the optical axis and performing a preferable optical scanning operation.

Concrete embodiments of the optical scanner shown in FIG. 1 will next be explained.

In the following three embodiments, the reflecting face of the reflective image forming element 6 is a coaxial aspherical surface in the fourth construction. A barrel type toroidal face of the elongated lens 7 on its incident side is an aspherical surface barrel type toroidal face in the fifth construction. The light beam from the light source, i.e., the light beam emitted from the coupling lens 2 is a divergent light beam in the sixth construction.

In the following description, $A_x$ and $A_y$ are respectively set to opening widths of the aperture 3 in the main scan-corresponding direction and the cross-scan corresponding direction. $d_0$ is set to a distance from the aperture 3 to an incident face of the cylindrical lens 4. $d_1$ is set to a distance from a light emitting face of the cylindrical lens 4 to a deflecting reflecting face of the rotary polygon mirror 5. $d_2$ is set to a distance from this deflecting reflecting face to the reflective image forming element 6. $d_3$ is set to a distance from the reflective image forming element 6 to an incident face of the elongated lens 7. $d_4$ is set to a distance from a light emitting face of the elongated lens 7 to the scanned face.

Further, r is set to a radius of curvature of the incident face (a light source side face) of the cylindrical lens 4 in the cross scan-corresponding direction. $D_1$ is set to a thickness of the cylindrical lens 4. $n_0$ is set to a refractive index of a material of the cylindrical lens 4. L is set to a maximum scanning width of the scanned face scanned by the deflected light beam.

An X-coordinate is set to a direction of the optical axis and a Y-coordinate is set to a direction perpendicular to the optical axis. R is set to a radius of curvature of a coaxial aspherical surface of the reflective image forming element 7 on the optical axis. K is set to a conical constant. A, B, C and D are set to aspherical coefficients of higher orders. In this case, the coaxial aspherical surface of the reflective image forming element 7 is a curved surface obtained by rotating a curve represented by the following formula using these values around the optical axis.

$$X=(1/R)Y^2/[1+\sqrt{1-(1+K)(Y/R)^2}]+A \cdot Y^4+B \cdot Y^6+C \cdot Y^8+D \cdot Y^{10}$$

A shape of the coaxial aspherical surface of the reflective image forming element 7 is specified by providing the curvature radius R on the optical axis, the conical constant K and the aspherical coefficients A, B, C and D.

The elongated lens 7 has a normal toroidal face as its light emitting side face. This normal toroidal face has a radius $r_{2m}$ of curvature with respect to the main scan-corresponding direction and has a radius $r_{2s}$ of curvature with respect to the cross scan-corresponding direction. In the following description, an x-coordinate is set to a direction of the optical axis and rim is set to central curvature of an incident side face of the elongated lens 7 with respect to the main scan-corresponding direction. k is set to a conical constant and h is set to a distance measured from a center of the incident side face of the elongated lens 7 in the main scan-corresponding direction. Further, a, b, c and d are set to aspherical coefficients of higher orders. In this case, the incident side face of the elongated lens 7 is a curved surface obtained by rotating a curve represented by the following formula using these values around a straight line which is parallel to the main scan-corresponding direction and is separated from the above center by a distance $r_{1s}$.

$$x=(1/r_{1m})h^2/[1+\sqrt{1-(1+k)(h/r_{1m})^2}]+a \cdot h^4+b \cdot h^6+c \cdot h^8+d \cdot h^{10}$$

A shape of the incident side face of the elongated lens 7 is specified by providing the above values $r_{1m}$, $r_{1s}$, k, a, b, c and d. $d_5$ is set to a thickness of the elongated lens 7 on the optical axis and n is set to a refractive index of a material of the elongated lens 7. A unit of length with respect to each of the above values is set to "mm".

EMBODIMENT 1

$A_x$: 3.14, $A_y$: 1.12, $d_0$: 10, $d_1$: 167, $d_2$: 114.4, $d_3$: 118.9, $d_4$: 93.0, r: 64.5, $D_1$: 3.0, $n_0$: 1.511, R: − 370.6, K: − 1.502, A: 5.174E−10,

B: − 2.319E−14, C: − 5.075E − 18, D: 1.896E−22, $r_{1m}$: − 700,

-continued k: 1.374, a: 4.221E−9, b: − 1.958E−13, c: 4.248E−18, d: −

1.265E−22, $r_{1s}$: − 57.4, $r_{2m}$: − 780, $r_{2s}$: − 25.2, $d_5$: 3.0, n: 1.572, L: 297

In this embodiment, $m_0$ is set to 0.57. The relation between a defocusing amount (a shift between the scanned face and an image forming position of the scanned light beam) and the spot diameter is provided as shown in FIGS. 2a and 2b.

As shown in FIG. 2a, the spot diameter has a sufficient depth range (approximately, 8 mm) at an image height 0 and a maximum image height 148.5 mm with respect to the main scanning direction.

Further, the spot diameter has a sufficient depth range (a minimum value 7 mm at the maximum image height 148.5 mm) with respect to the cross scanning direction as a problem.

EMBODIMENT 2

$A_x$: 3.04, $A_y$: 0.44, $d_0$: 84.9, $d_1$: 72.1, $d_2$: 113.1, $d_3$: 151.9, $d_4$: 59.5, r: 47.5, $D_1$: 3.0, $n_0$: 1.511, R: − 370.6, K: − 1.63,

A: 3.561E−10, B: − 4.579E−14, C: − 3.702E−18,

D: 1.695E−22, $r_{1m}$: − 628, k: − 0.254, a: 6.239E−9, b: −

2.137E−13, c: 1.434E−18, d: − 3.627E−23, $r_{1s}$: −

52.5, $r_{2m}$: − 700, $r_{2s}$: − 19.9, $d_5$: 3.0, n: 1.572, L: 297

Figure 3A:
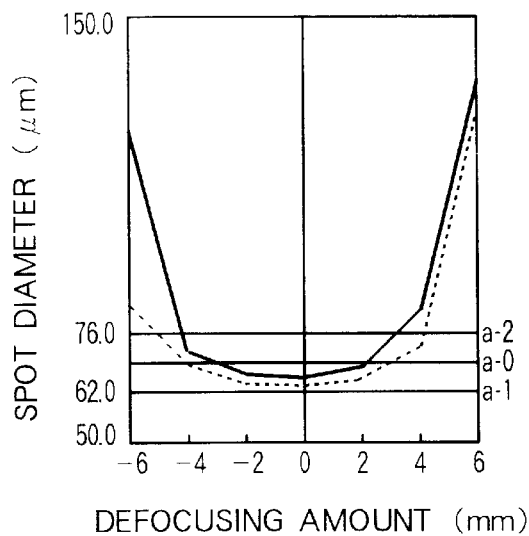
FIGS. 3a and 3b are views respectively showing the relation between a defocusing amount and spot diameters in main and cross scanning directions with respect to an embodiment 2.
Figure 3B:
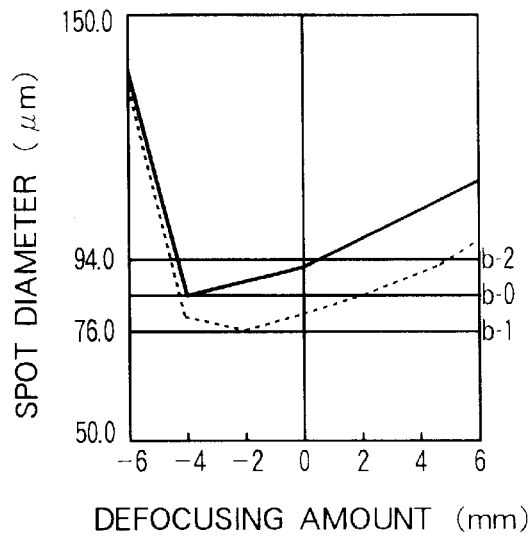

In this embodiment, $m_0$ is set to 0.37 and the relation between a defocusing amount and the spot diameter in the main scanning direction and the cross scanning direction is provided as shown in FIGS. 3a and 3b.

As shown in FIG. 3a, the spot diameter has a sufficient depth range (approximately, 7 mm) at an image height 0 and a maximum image height 148.5 mm with respect to the main scanning direction. Further, the spot diameter has a sufficient depth range (a minimum value approximately 5 mm at the maximum image height 148.5 mm) with respect to the cross scanning direction as a problem.

From the comparison of FIGS. 2b and 3b, it should be understood that the depth range of the spot diameter in the cross scanning direction tends to be narrowed as $m_0$ is reduced.

When $m_0$ is smaller than 0.35 as a lower limit in the condition (1), it is difficult to secure 4 mm required as a depth range.

The depth range can be enlarged by increasing a clearance between the aperture 3 and the deflecting reflecting face even when $m_0$ is smaller than 0.35. However, in this case, it is difficult to make the optical scanner compact so that it is not preferable to increase this clearance.

As can be clearly seen from the comparison of FIGS. 2b and 3b, a difference between a spot diameter (shown by a broken line) in the cross scanning direction at the image height 0 and a spot diameter (shown by a solid line) at the maximum image height 148.5 mm in FIG. 3b showing a smaller conjugate magnification $m_0$ is enlarged in comparison with FIG. 2b relating to the embodiment 1.

This enlargement means that a variation width of the spot diameter in the cross scanning direction according to the image height in the embodiment 2 is wider than that in the embodiment 1. When the variation of the spot diameter according to the image height is large, resolving power of a recorded image is greatly changed as the image height of the light spot is increased. Accordingly, it is desirable to reduce such a difference in variation width of the spot diameter as much as possible.

In the embodiment 1, $m_0$=0.574 and m (H=148.5)=0.595 and the conjugate magnification is monotonously increased as the image height is increased. Accordingly, the value of parameter $m(H)/m_0$ in the condition (2) is 1.037 at its maximum and satisfies this condition (2).

The variation of the spot diameter in the cross scanning direction is a small value of 6.1 $\mu$m at its maximum so that an optical scanning operation can be preferably performed. Namely, the embodiment 1 becomes an embodiment of each of the first and second constructions of the present invention.

In the embodiment 2, $m_0$=0.37 and m(H=148.5)=0.41 and the conjugate magnification is monotonously increased as the image height is increased. Accordingly, the value of parameter $m(H)/m_0$ in the condition (2) is 1.11 at its maximum and does not satisfy this condition (2).

The variation of the spot diameter in the cross scanning direction is a slightly large value of 11.7 $\mu$m at its maximum.

Therefore, the embodiment 2 is inferior to the embodiment 1 with respect to characteristics of a change of the spot diameter in the cross scanning direction according to the image height.

As mentioned above, in the embodiment 1, a depth region of the spot diameter in the cross scanning direction is wide in an entire effective scanning region and the variation of the above spot diameter according to the image height is small.

In the embodiment 1, with respect to the deflected light beam forming the light spot at the image height 0 on the scanned face, θ is set to an angle formed between an incident direction of this deflected light beam incident to the reflective image forming element 6 and a reflecting direction of this deflected light beam on the reflective image forming element 6. This angle θ is set to 7 degrees. Accordingly, the optical scanning operation can be preferably performed as mentioned above. In contrast to this, when this angle θ is greater than 8 degrees, the comatic aberration outside the optical axis is increased as the image height is increased as mentioned above, thereby increasing the spot diameter. Therefore, the variation of the spot diameter in the cross scanning direction according to the image height is excessively increased so that no optical scanning operation can be preferably performed.

EMBODIMENT 3

$A_x$: 3.07, $A_y$: 1.05, $d_0$: 41.0, $d_1$: 136.1, $d_2$: 114.4, $d_3$: 118.3, $d_4$: 93.0 r: 64.5, $D_1$: 3.0, $n_0$: 1.511, R: − 370.7, K: − 1.58,

A: 7.124E−10, B: − 9.415E−14, C: 2.309E−18, D: − 7.138E−23, $r_{1m}$: − 700, k: − 1.374, a: 4.221E−9, b: − 1.958E−13, c: 4.248E−18, d: − 1.265E−22, $r_{1s}$: − 57.3, $r_{2m}$: − 780, $r_{2s}$; − 25.1, $d_5$: 3.0, n: 1.572, L: 297

Figure 4A:
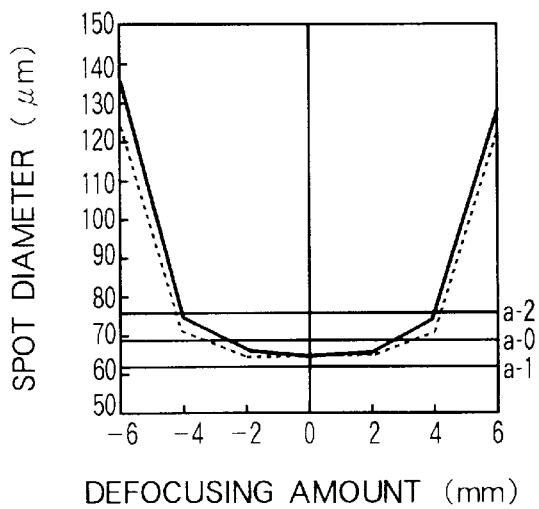
FIGS. 4a and 4b are views respectively showing the relation between a defocusing amount and spot diameters in main and cross scanning directions with respect to an embodiment 3.
Figure 4B:
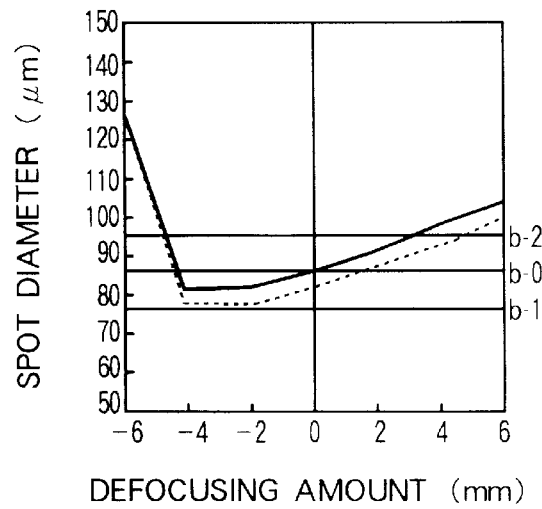

In this embodiment, $m_0$ is set to 0.57 and the relation between a defocusing amount and the spot diameter in the main scanning direction and the cross scanning direction is provided as shown in FIGS. 4a and 4b.

As shown in FIG. 4a, the spot diameter has a sufficient depth range (approximately, 8 mm) at an image height 0 and a maximum image height 148.5 mm with respect to the main scanning direction. Further, the spot diameter has a sufficient depth range (a minimum value approximately 8 mm at the maximum image height 148.5 mm) with respect to the cross scanning direction as a problem.

The above angle θ with respect to an inclination of the reflective image forming element is 4.9 degrees. Since the angle θ is set to be small, the variation of the spot diameter in the cross scanning direction according to the image height is a very small value equal to or smaller than 4 $\mu$m so that the optical scanning operation can be very preferably performed.

In this embodiment 3, the conjugate magnification $m_0$ in the condition (1) is 0.57 and the parameter $m(H)/m_0$ in the condition (2) is 1.04. Accordingly, both the conditions (1) and (2) are satisfied.

In the embodiment 3, the inclination angle of the reflective image forming element 6 is set to be small so that the comatic aberration outside the optical axis is effectively restrained. Accordingly, the variation of the spot diameter in the cross scan-corresponding direction according to the image height is restrained to be extremely small.

A designed value of the spot diameter in each of the above embodiments 1 to 3 is 69 $\mu$m (straight line a-0 in each of FIGS. 2a, 3a and 4a) with respect to the main scanning direction and is 85 $\mu$m (straight line b-0 in each of FIGS. 2b, 3b and 4b) with respect to the cross scanning direction. Straight lines a-1 and a-2 in FIGS. 2a, 3a and 4a respectively show lower and upper limits of an allowable range of scatter of the spot diameter in the main scanning direction.

As explained above, in the novel optical scanner of the present invention having the above construction, scatter of the spot diameter in the cross scanning direction with respect to its designed value can be effectively reduced in the first to sixth constructions.

In the above second construction of the optical scanner in the present invention, scatter of the spot diameter in the cross scanning direction with respect to its designed value can be effectively reduced. Further, the variation of the spot diameter in the cross scanning direction according to the image height of the light spot can be effectively reduced.

In the above third construction of the optical scanner in the present invention, scatter of the spot diameter in the cross scanning direction with respect to its designed value and/or the variation of the spot diameter in the cross scanning direction according to the image height of the light spot can be effectively reduced. Further, light utilization efficiency is preferable.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scanner in which light of a peripheral portion of a light beam from a light source is interrupted by an aperture and in which a non-peripheral portion of said light beam is focused and formed as a linear image extending in a main scan-corresponding direction, said scanner comprising:

an optical deflector for deflecting said non-peripheral portion of said light beam at an angular velocity wherein said optical deflector has a deflecting reflecting face in proximity to said linear image in order to provide a deflected light beam;

a reflective image forming element for reflecting said deflected light beam and an elongated lens for converging the reflected deflected light beam as a light spot on a scanned face to thereby perform an optical scanning operation at a constant speed;

wherein said reflective image forming element has a reflecting face with rotation symmetry and provides for convergence of the reflected deflected light beam onto the scanned face in the main scan-corresponding direction and wherein said elongated lens has a first toroidal face as an incident face and a second toroidal base as a light emitting face;

wherein said elongated lens sets the scanned face and a forming position of said linear image to a substantially conjugate relation in a cross-scan corresponding direction in cooperation with said reflecting image forming element; and wherein said elongate lens provides a conjugate magnification in said conjugate relation of the reflective image forming element and the elongated lens which is set to $m_0$ with respect to an image height 0 of the light spot and said $m_0$ satisfies the following condition wherein $1 > m_0 > 0.35$ and wherein the conjugate magnification in said conjugate relation of the reflective image forming element and the elongated lens is set to $m(H)$ with respect to an image height H, and wherein $m_0$ and $m(H)$ satisfy the following condition whereby $m(H)/m_0 < 1.1$.

2. An optical scanner as claimed in claim 1, wherein, with respect to the deflected light beam forming the light spot at the image height 0 on the scanned face, $\theta$ is set to an angle formed between an incident direction of this deflected light beam incident to the reflective image forming element and a reflecting direction of this deflected light beam reflected on said reflective image forming element, and this $\theta$ satisfies the following condition $$\theta < 8 \text{ degrees} \tag{3}$$

3. An optical scanner as claimed in claim 1, wherein the reflecting face of the reflective image forming element is formed in the shape of a coaxial aspherical surface.

4. An optical scanner as claimed in claim 1, wherein the barrel type toroidal face of the elongated lens on its incident side is set to a non-spherical barrel type toroidal face.

5. An optical scanner as claimed in claim 1, wherein the light beam from the light source is a divergent light beam.

* * * * *

UNITED STATES PATENT AND TRADEMARK OFFICE
CERTIFICATE OF CORRECTION

PATENT NO. : 5,805,324
DATED : September 8, 1998
INVENTOR(S) : Osamu ENDOU

It is certified that error appears in the above-identified patent and that said Letters Patent is hereby corrected as shown below:

On the title page, Item [73], the Assignee, is incorrect. It should read:

-- Ricoh Company, Ltd., Tokyo, Japan --

Signed and Sealed this

Twenty-sixth Day of January, 1999

Attest:

Attesting Officer

*Acting Commissioner of Patents and Trademarks*